United States Patent [19]

Drack

[11] Patent Number: 4,998,622
[45] Date of Patent: Mar. 12, 1991

[54] PLASTIC PAIL AND LID

[76] Inventor: Alfred Drack, Agathaberg 21, D-5272 Wipperfurth, Fed. Rep. of Germany

[21] Appl. No.: 424,212
[22] PCT Filed: Apr. 16, 1988
[86] PCT No.: PCT/EP88/00325
 § 371 Date: Oct. 6, 1989
 § 102(e) Date: Oct. 6, 1989
[87] PCT Pub. No.: WO88/07962
 PCT Pub. Date: Oct. 20, 1988

[30] Foreign Application Priority Data

Apr. 18, 1987 [DE] Fed. Rep. of Germany ....... 8705705
Nov. 4, 1987 [DE] Fed. Rep. of Germany ....... 8714684

[51] Int. Cl.$^5$ .............................................. B65D 21/02
[52] U.S. Cl. .................................... 206/519; 206/515; 220/91; 220/96; 220/266; 220/270
[58] Field of Search ........................ 206/515, 519, 520; 220/91, 94, 96, 266, 270, 276

[56] References Cited

U.S. PATENT DOCUMENTS

| | | | |
|---|---|---|---|
| 3,425,471 | 2/1969 | Yates | 206/519 |
| 3,550,807 | 12/1970 | Yates | 220/91 |
| 4,293,073 | 10/1981 | Yates | 220/91 |
| 4,296,871 | 10/1981 | Andersson | 220/266 |
| 4,449,641 | 5/1984 | Jorgensen | 220/270 |
| 4,821,910 | 4/1989 | Poirier | 220/266 |

FOREIGN PATENT DOCUMENTS 2109956 9/1972 Fed. Rep. of Germany ...... 206/519

*Primary Examiner*—George E. Lowrance
*Attorney, Agent, or Firm*—Browdy and Neimark

[57] ABSTRACT

A plastic pail (23) and a plastic lid (22) are constructed at their rims so that the lid securely seals and catches in. Pockets to receive a carrying handle are part of a cylindrical ring (28) which surrounds the pail wall concentrically. This ring is drawn down arcuately at two diametrically opposite points (25), so that it is possible to grip and remove the lid (23) there, and a circular alignment of pails stacked nested without lids is simultaneously possible by this means.

In a particular construction the recesses formed by the arcuately down-drawn parts of the ring are covered by tear-off bridges (40) which are fastened to the ring radially outside the latter.

2 Claims, 5 Drawing Sheets

PLASTIC PAIL AND LID

FIELD OF THE INVENTION

The invention relates to a plastic pail with lid. The invention relates particularly to a plastic pail having a base, a wall widening conically from the latter towards the upper rim, the upper rim of which is constructed for the supporting and sealing reception of a lid, and two pockets arranged at the outer circumference of the wall, below the rim and at diametrically opposite points, and each provided with a hole to receive a carrying handle, and a plastic lid associated with said pail.

Pails with lid of this type are required to keep the granular, powdery, pasty or liquid material with which they are filled safely, to protect against accidental escape of this material and also against the entry of dust, dirt or moisture, to be mechanically stable and to be able to be opened and if possible also closed tightly again without special tools.

BACKGROUND OF THE INVENTION

In a pail with lid according to U.S. Pat. No. 4,335,827 the abovementioned pockets to receive a carrying handle are part of a cylindrical ring concentrically enclosing the pail wall, which is supported by an annular disk-shaped support ring which projects radially from the pail in proximity of its upper rim.

However, said known pail does not fulfil the practical requirement that, in the case of mechanical stacking, a plurality of still empty pails are aligned in the circular direction so that their carrying handles all face the same side. Such an alignment facilitates, or even makes possible, the gripping and removal of the top pail of a stack by a gripper.

It is also not simple, in the case of the known pail with superposed lid, to grip said lid and remove it without a special tool.

SUMMARY OF THE INVENTION

The underlying object of the invention is to construct a pail with lid of the abovementioned type so that the lid of a closed pail can be gripped easily and removed without a special tool, and also so that a circular alignment of the empty pails when stacked nested is achieved without special additional outlay.

The object is achieved according to the invention in that the cylindrical ring is drawn down arcuately towards the pail base at two diametrically opposite points of the pail circumference sufficiently to permit the lid to be gripped there, and that the arcuately down-drawn points of the cylindrical ring are bounded on the upper side and on the lower side by arcs of equal radii thereby permitting a circular alignment of nested pails without lids, and that due to the degree of the conicity in the pail rim region and to the interval between cylindrical ring and pail wall and the width of the cylindrical ring which extends downwards from the support ring, it is ensured that the cylindrical rings are braced upon each other when stacked or at least approach each other sufficiently for their arcuate pieces to engage sufficiently in a circumferential direction.

When empty pails of this type are stacked nested, a mechanical rotation of the inserted uppermost pail by a comparatively small angular amount is sufficient in each case to bring the lower arcs of its arcuately down-drawn parts into engagement with the upper arcs of the pail beneath it. An exact angular alignment is not necessary in this case. On the contrary, it is sufficient if the aforesaid lower arc is located only partly above the aforesaid upper arc, because upon being inserted the upper pail, by virtue of its weight, then automatically slides with its lower arcs fully into the receiving upper arcs of the pail beneath it.

As a further development of the invention it is provided, in addition, that at both of the two diametrically opposite arcuately down-drawn points of the cylindrical ring the recesses located above the upper arcs and provided for grasping and removing the lid are each covered by a tear-off bridge located radially just outside the cylindrical ring. This bridge therefore immediately permits the aforementioned stacking of empty pails and their circular alignment, since the arcuately down-drawn points of the respective upper pail are located radially within the said bridge and are consequently not obstructed from engaging into the arcuately down-drawn part of the next lower pail.

The said bridge represents no particular outlay in the production of the pail and therefore involves practically no increase in the cost of the pail.

On the other hand the lid of a filled and closed pail can be removed only if the aforesaid bridge is previously torn off, which is facilitated by rupture joints at its two ends. However, after the bridge is torn off the fact that the pail has been opened can be detected immediately.

BRIEF DESCRIPTION OF THE DRAWINGS

The invention is explained more fully below by exemplary embodiments illustrated in the drawing, in which.

DETAILED DESCRIPTION OF THE INVENTION

Figure 1:
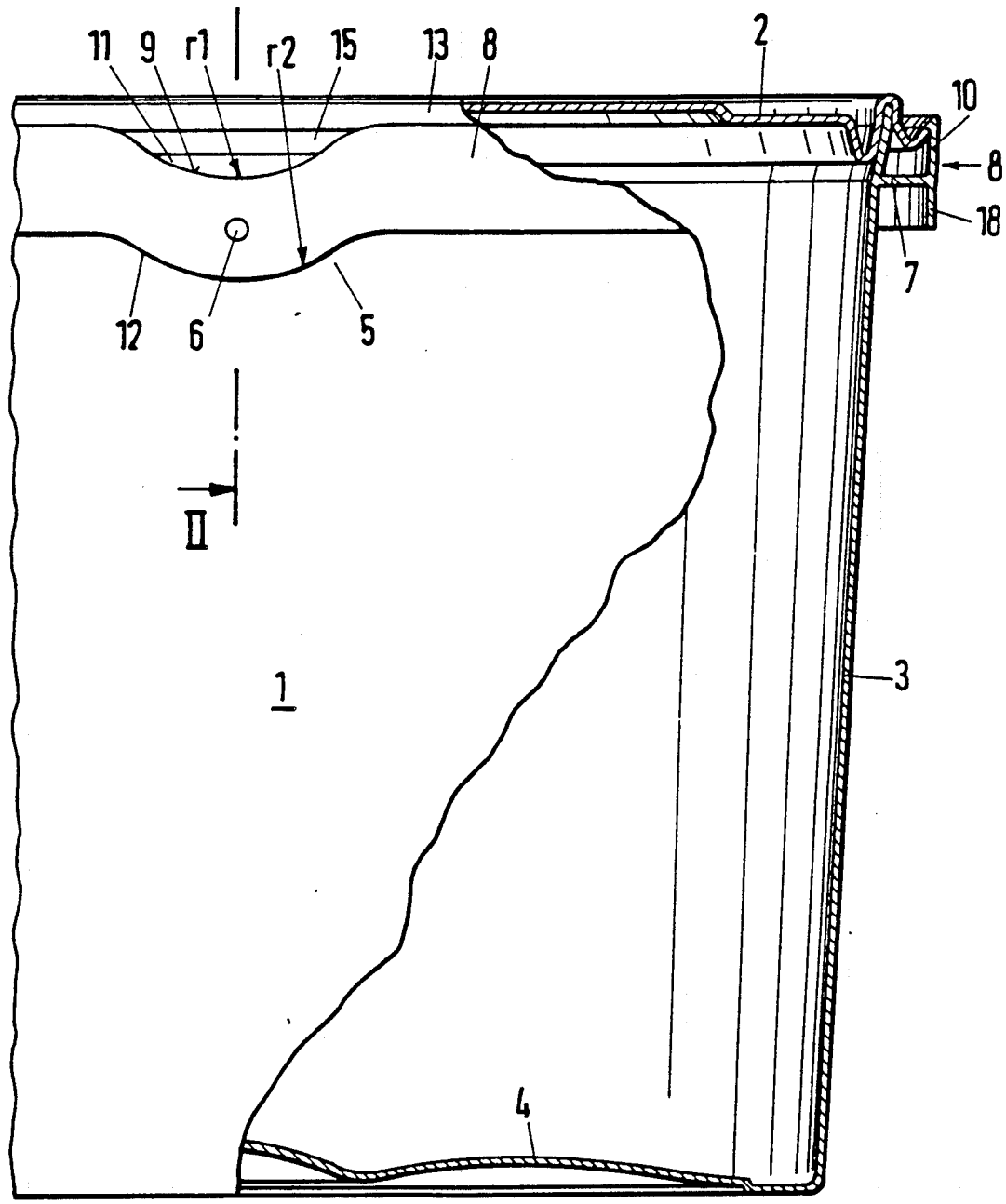
FIG. 1 shows a partly fragmented side elevation of a pail according to the invention with lid in position.

The pail 1 shown in FIG. 1 comprises a base 4, a wall 3 projecting from the latter and widening conically towards the upper rim, and an upper rim constructed for the supporting and sealing reception of a lid. The pail wall is surrounded concentrically at its upper rim by a cylindrical ring 8, which is supported by an annular disk-shaped support ring projecting radially from the upper rim of the pail near that rim. As may be seen from the left-hand part of FIG. 1, this cylindrical ring is drawn down arcuately towards the pail base at one point of the circumference, namely at 5. An identical drawing down is also present diametrically opposite this point.

The down-drawn part 5 is bounded on the upper side by an arc 9 having a radius r1, and on the underside by an arc 12 having the radius r2, the two radii being equal and being spaced apart by an annular width.

An aperture 6 to receive the bent end of a carrying handle is provided in each arcuately down-drawn part of the rim.

A lid 2 is placed on the pail 1 and closes the pail tightly. The closure can be seen more clearly in the larger scale illustration in FIG. 2.

The upper end of the wall 3 of the pail, which has a conicity of approximately 3°, is adjoined by a bracing part 11 of greater conicity, approximately 13° in this case. This bracing part is adjoined on its upper side by a cylindrical sealing part 14.

At the junction between the slightly conical wall 3 and the more strongly conical bracing part 11 an annular disc-shaped support ring 7 projects outwards in the radial direction and carries a somewhat cylindrical ring 8 concentric with the pail wall.

The ring 8 has as its upper part a snap ring 10, which exhibits a slight conical widening of approximately 3° in the exemplary embodiment shown. An annular bead 17 having a lower stop surface oriented somewhat radially inwards and an upper oblique ramp surface, and extending round the circumference of the pail, is present at the upper end of this snap ring.

The lid 2 has radially outside its central part an annular fold which is adjoined by a part 13 of U-shaped sectional construction, which engages round and clamps and seals the cylindrical sealing part 14 of the pail after the lid is placed in position.

This U-shaped part 13 is adjoined outside the bracing part 11 of the pail by a part of vee-shaped cross section. The part 15 of this vee-shaped part, which is located radially outwards, ends in a radially extending end face 16 which engages and catches behind the lower stop surface of the annular bead 17 after the lid is placed in position, and therefore opposes the removal of the lid to a certain extent.

The cylindrical ring 8 further has a cylindrical ring lower part 18, which adjoins the support ring 7 and the snap ring 10 integrally at their junction.

Figure 2:
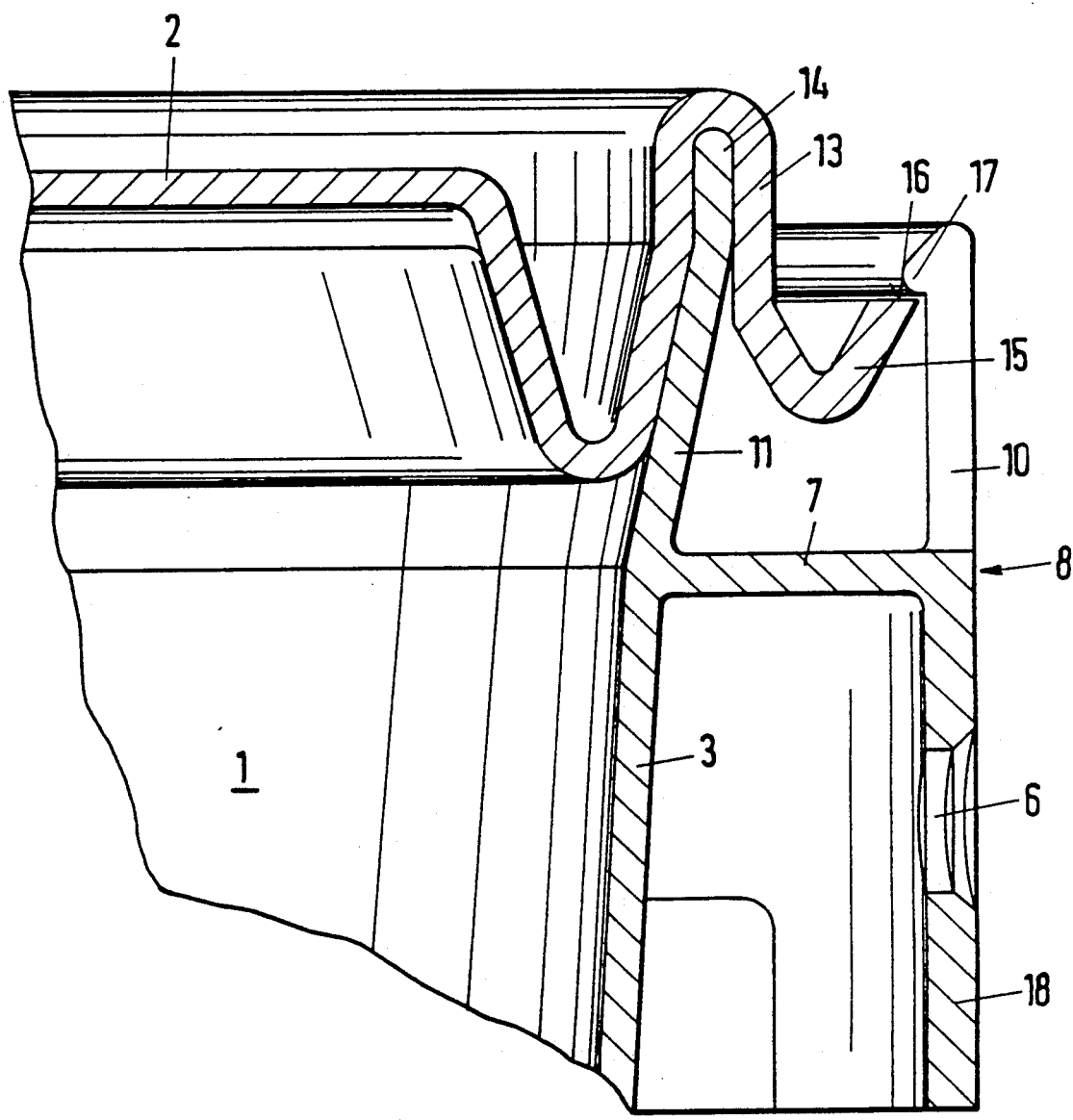
FIG. 2 shows a partial section on a larger scale along the line II—II in FIG. 1.

At the two arcuately down-drawn parts 5 of the cylindrical ring 8 it is possible, as FIGS. 1 and 2 show, to grasp beneath the retaining ring 15 of the lid, which is exposed at these down-drawn points.

In the embodiment according to FIGS. 3 to 6 the shape of the pail and of the lid is practically unchanged. The upper recesses merely extend somewhat into the support web, and a tear-off bridge is present radially outside them, both of which are explained in more detail below.

The pail 21 here again has a wall 23 widening slightly conically upwards and a base 24 (FIG. 4) and at the upper rim, a cylindrical sealing part 34, round which the correspondingly shaped rim 33 of a lid 22 can fit.

Just below the upper rim an annular disc-shaped support part 27 projects radially outwards from the pail wall 23, and carries a cylindrical ring 28 which surrounds the pail wall concentrically. This ring consists of an upper snap ring 30 with annular bead at the upper end and an outward-projecting cylindrical ring part 38.

Figure 3:
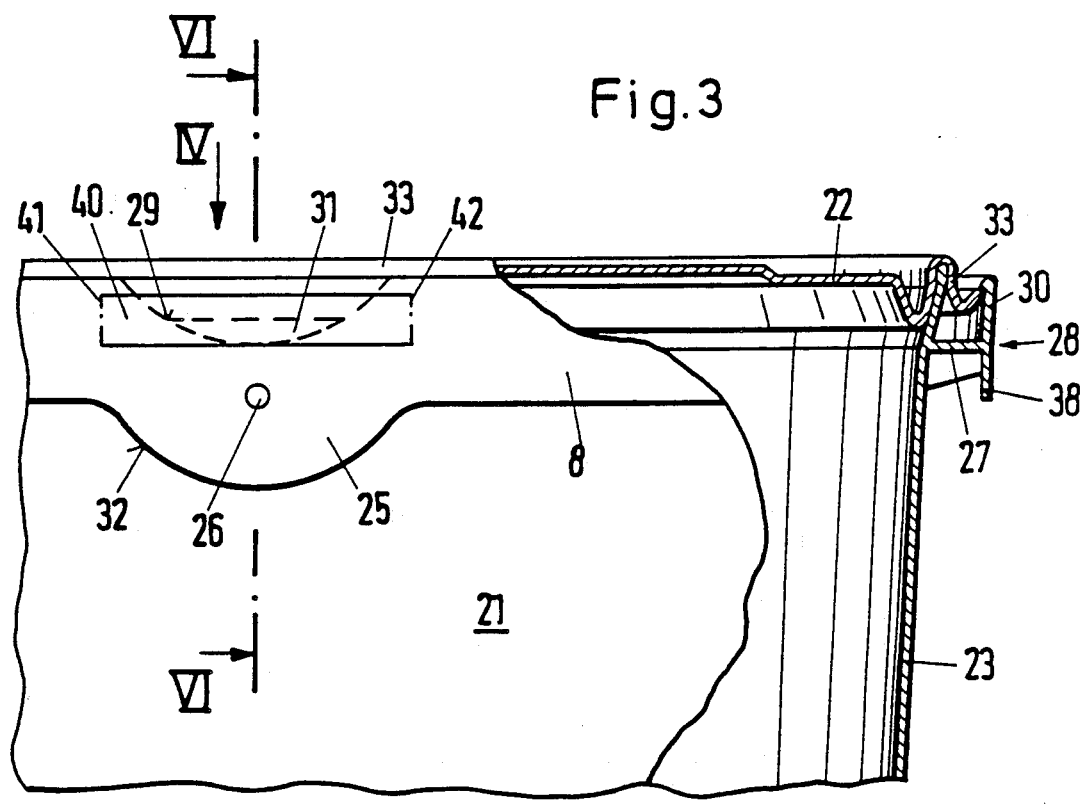
FIG. 3 shows a partly fragmented partial side elevation of a variant embodiment, similar to the illustration in FIG. 1.

The cylindrical ring 28 is drawn down arcuately at two opposite points of the lid rim, as may be seen from FIG. 3. An aperture 26 to receive the respective end of a carrying handle is also provided in the cylindrical ring there in each case. Each arcuately down-drawn point 25 is bounded on the upper side by an arc 29, and on the underside by an arc 32, which here again have an equal radius and being spaced apart by an annular width.

A rectangular bridge 40, which extends transversely across each recess bounded by the upper arc 29, is arranged radially outside the cylindrical ring 28 and is connected to this ring at both its ends. Rupture joints 41 and 42 are provided in this case at the two junctions to permit the bridge to be torn off easily.

It is clear that the bridge masks the aperture above the upper arc 29 and thus prevents interference with and raising of the lid.

However, as soon as the bridge 40 has been torn off, the bracing part 31 appears in the aperture above the arc 29 as an upper conical prolongation of the pail wall 23, above which the lower edge of the vee-shaped lid rim is present. The lid can therefore now be pulled off.

Figure 4:
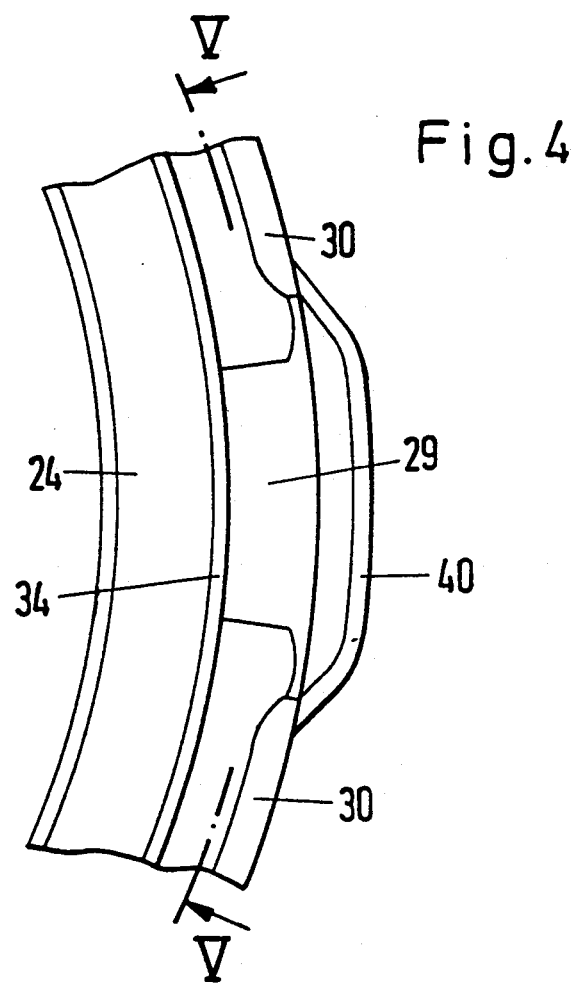
FIG. 4 shows a plan view on a larger scale in the direction of the arrow IV in FIG. 3 of a part of the pail rim, with lid removed.
Figure 6:
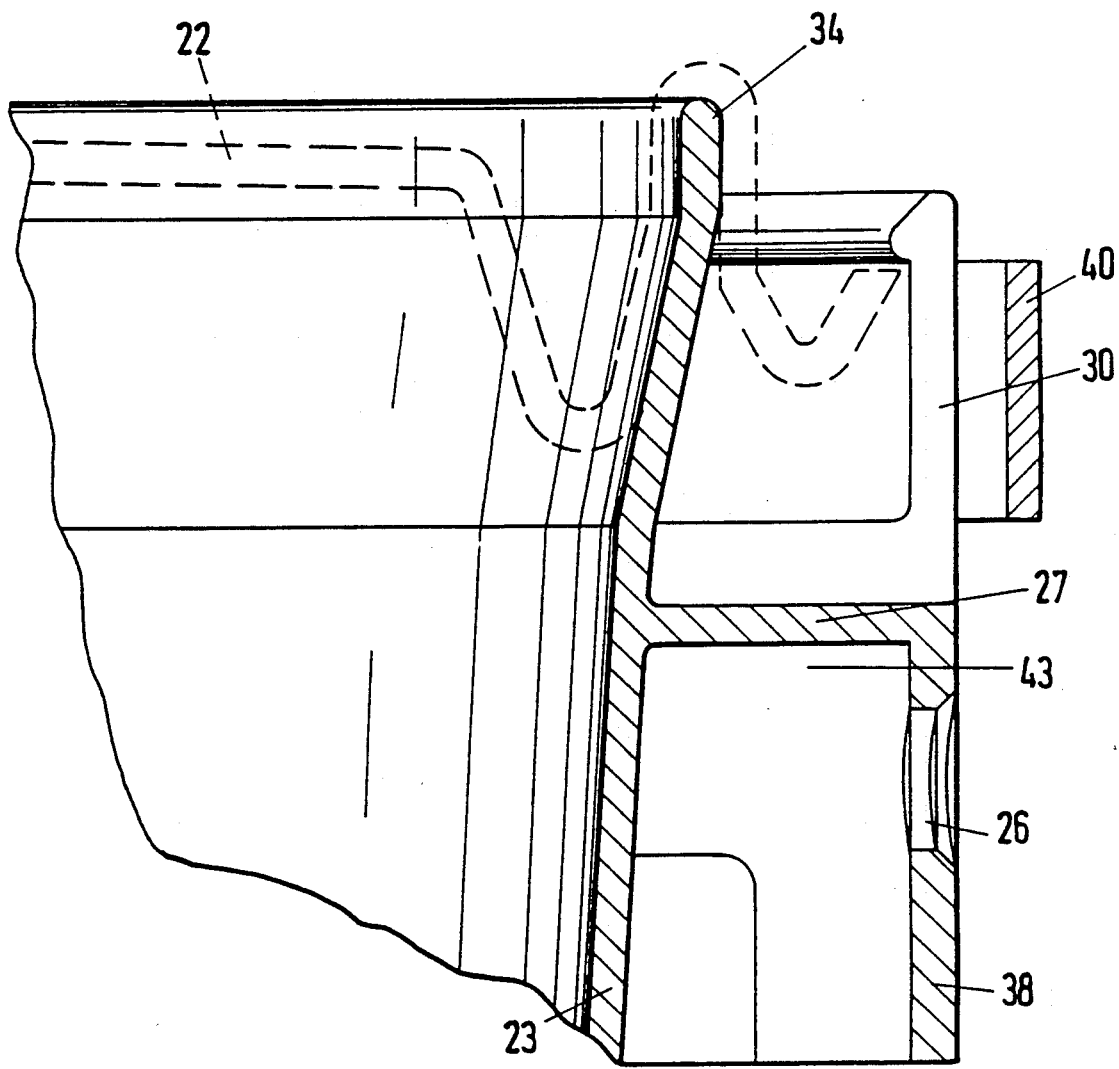
FIG. 6 shows a partial section on a larger scale along the line VI—VI in FIG. 3.

As FIGS. 4 and 6 show particularly, before it is torn off the bridge 40 does not obstruct the nested stacking of empty pails, because then the lower arc 32 of the respective uppermost pail can engage into the upper arc 29 of the pail beneath it and thus ensure an alignment in the circular direction.

Figure 5:
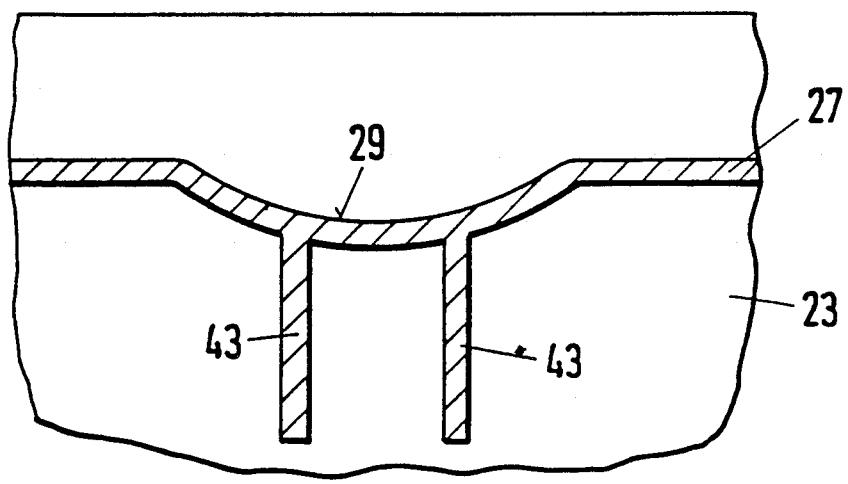
FIG. 5 shows a section along the arc V—V in FIG. 4.

In this case, FIG. 5 of the drawing shows how the otherwise annular disc-shaped support ring 27 is likewise drawn down arcuately at this point.

Since the greatest vertical stress occurs at these two down-drawn places, when empty pails are stacked one upon the other on the one hand, and when a full pail is carried by a carrying handle on the other hand, ribs 43 have been provided here beneath the support ring 27 on both sides of the aperture 26, which ribs connect the support ring to the pail wall 23, on the one hand, and to the ring part 38, on the other.

LIST OF REFERENCE NUMERALS 1,21 Pail
2,22 Lid
3,23 Pail wall
4,24 Pail base
5,25 Down-drawn rim part
6,26 Apertures for carrying handle
7,27 Support ring
8,28 Cylindrical ring
9,29 Upper arc
10,30 Snap ring
11,31 Bracing part
12,32 Lower arc
13,33 U-shaped part
14,34 Bracing part
15 Retaining ring
16 End face
17 Annular bead
18,38 Ring lower part
40 Bridge
41,42 Breaking points
43 Ribs

I claim:

1. In combination, a plastic pail and lid comprising a base (4), a wall (3) widening conically from said base towards and upper rim of said pail, said upper rim being constructed to support and seal a lid (2); said wall having two pockets disposed at outer circumferences of the wall below said upper rim and at diametrically opposite points, each pocket being provided with a hole (6) to receive a carrying handle, and said plastic lid; said pockets being part of a cylindrical ring (8, 28) concentrically enclosing said wall (3, 23), said ring being supported by an annular disk-shaped support ring (7, 27) which projects radially from said in proximity of said upper rim, wherein the cylindrical ring, is drawn down arcuately towards the base at two diametrically opposite points of said circumference to permit said lid to be gripped, and wherein said arcuately down-drawn points of the cylindrical ring are bounded on upper arcs (9, 29) and on a lower side (12, 32) by arcs of equal radii (r1, r2) to permit a circular alignment of nested pails without lids; said pail having a degree of conicity in a region of the rim and an interval between said cylindrical ring and pail wall and width of the cylindrical ring which extends downwards from the support ring, to ensure that the cylindrical rings are braced upon each other when stacked or at least approach each other sufficiently through engagement of their arcuate points in a circumferential direction.

2. The pail and lid combination of claim 1, wherein, at diametrically opposite arcuately down-drawn points (25) of the cylindrical ring (28), recesses are located above the upper arcs and provide for grasping and removing the lid; each recess being covered by a tear-off bridge (40) located radially outside of cylindrical ring (28).

* * * * *